(12) United States Patent
Zhao et al.

(10) Patent No.: US 10,197,299 B2
(45) Date of Patent: Feb. 5, 2019

(54) AIR CONDITIONING SYSTEM, CONTROL SYSTEM THEREFOR AND AIR-CONDITIONING CONTROL METHOD

(71) Applicant: SICHUAN CHANGHONG ELECTRIC CO., LTD., Mianyang (CN)

(72) Inventors: Yong Zhao, Mianyang (CN); Jin Li, Mianyang (CN); Ming Zhong, Mianyang (CN); Shaolong Zhang, Mianyang (CN); Yunzhong Liu, Mianyang (CN); Sheng Zhang, Mianyang (CN)

(73) Assignee: Sichuan Changhong Electric Co., Ltd., Mianyang (CN)

( * ) Notice: Subject to any disclaimer, the term of this patent is extended or adjusted under 35 U.S.C. 154(b) by 783 days.

(21) Appl. No.: 14/432,164

(22) PCT Filed: Sep. 25, 2013

(86) PCT No.: PCT/CN2013/084156
§ 371 (c)(1),
(2) Date: Mar. 27, 2015

(87) PCT Pub. No.: WO2014/048316
PCT Pub. Date: Apr. 3, 2014

(65) Prior Publication Data
US 2015/0253026 A1    Sep. 10, 2015

(30) Foreign Application Priority Data

Sep. 29, 2012    (CN) .......................... 2012 1 0374575

(51) Int. Cl.
*F25B 31/00*    (2006.01)
*F24F 11/30*    (2018.01)
(Continued)

(52) U.S. Cl.
CPC .............. *F24F 11/30* (2018.01); *F24F 11/62* (2018.01); *F25B 13/00* (2013.01); *F25B 49/02* (2013.01);
(Continued)

(58) Field of Classification Search
CPC .......... F25B 2313/023; F25B 2313/025; F25B 31/002; F25B 31/004; F25B 2500/16; F25B 2700/03; F25B 2700/04
See application file for complete search history.

(56) References Cited

U.S. PATENT DOCUMENTS 5,361,595 A * 11/1994 Shimura .................. F24F 3/065
62/174
6,986,259 B2 * 1/2006 Takegami ............... F25B 13/00
62/192
(Continued)

FOREIGN PATENT DOCUMENTS

CN    1078037 A    3/2001
CN    1719132 A    1/2006
(Continued)

OTHER PUBLICATIONS

International Search Report for International Application No. PCT/CN2013/084156 dated Dec. 19, 2013 (with English translation), 6 pages.

*Primary Examiner* — Ned Landrum
*Assistant Examiner* — Daniel C Comings
(74) *Attorney, Agent, or Firm* — Sheppard Mullin Richter & Hampton LLP (57) ABSTRACT

Disclosed is an air conditioning system, comprising M outdoor units (101) for providing warm or cold sources, M being a positive integer; N indoor units (102) for receiving a warm or cold source supplied by one or more of the at least one outdoor unit (101), N being a positive integer; a control system (103) comprising a lubricating oil distributing sub-
(Continued)

system (1031) connected to the M outdoor units (101); a cold medium distributing subsystem (1032) connected to the M outdoor units (101); and a control subsystem (1033) connected to the M outdoor units (101), the N indoor units (102), the lubricating oil distributing subsystem (1031) and the cold medium distributing subsystem (1032). Further disclosed are a control system and an air-conditioning control method.

14 Claims, 3 Drawing Sheets

(51) Int. Cl.
*F24F 11/62* (2018.01)
*F25B 13/00* (2006.01)
*F25B 49/02* (2006.01)
*G05B 15/02* (2006.01)

(52) U.S. Cl.
CPC ............ *G05B 15/02* (2013.01); *F25B 31/002* (2013.01); *F25B 31/004* (2013.01); *F25B 2313/023* (2013.01); *F25B 2313/025* (2013.01); *F25B 2500/16* (2013.01)

(56) References Cited

U.S. PATENT DOCUMENTS

| 7,578,137 B2 * | 8/2009 | Jang | F25B 13/00 |
| | | | 62/175 |
| 2013/0000339 A1 * | 1/2013 | Shimazu | F25B 31/004 |
| | | | 62/192 |

FOREIGN PATENT DOCUMENTS

| CN | 102901189 A | 1/2013 |
| CN | 103062840 A | 4/2013 |
| CN | 103062841 A | 4/2013 |
| JP | 1993-010620 | 1/1993 |
| JP | 1995-133969 | 5/1995 |
| KR | 2005-0075061 | 7/2005 |

* cited by examiner

AIR CONDITIONING SYSTEM, CONTROL SYSTEM THEREFOR AND AIR-CONDITIONING CONTROL METHOD

This application is a U.S. National Stage Application under 35 U.S.C. § 371 of International Application No. PCT/CN2013/084156, filed Sep. 25, 2013, designating the United States and claiming priority to Chinese Patent Application No. 201210374575.0, filed with the Chinese Patent Office on Sep. 29, 2012 and entitled "Air conditioning system, control system and air-conditioning control method", the contents of which are hereby incorporated by reference in their entirety.

FIELD

The present invention relates to the field of air conditioning and particularly to an air conditioner system, a control system and an air conditioner controlling method.

BACKGROUND

An air conditioner, i.e., a room air conditioner, is a set of machines configured to vary the temperature of air in a space area (which is typically airtight). It functions to adjust the temperature, humidity, purity, flow rate and other parameters of the air in the room (or the airtight space or area) to thereby satisfy the requirement on comfort of a human body or on a process flow. Traditionally it is known to utilize the air conditioner as a cooling device, in which an indoor machine is connected with an outdoor machine through a refrigerant pipe.

The air conditioner is categorized into a cooling-only air conditioner and a cooling-heating air conditioner, both of which operate under the same principle, and the air conditioner typically is used with Freon as a refrigerant. Freon is characterized by releasing a large amount of heat when being changed from the gas state into the liquid state and absorbing a large amount of heat when being changed from the liquid state into the gas state. The air condition has been designed under this principle.

A compressor compresses the refrigerant in the gas state into the refrigerant in the gas state with high temperate and high pressure and then feeds the refrigerant to a condenser (the outdoor machine) where the refrigerant radiating heat is changed into the refrigerant in the liquid state with normal temperature and high pressure, so hot wind is fed out of the outdoor machine.

Then the refrigerant enters an evaporator (the indoor machine) through a capillary, and the refrigerant entering the evaporator through the capillary suddenly becomes larger in volume and thus the pressure thereof becomes lower, so the refrigerant in the liquid state will be gasified into the refrigerant in the gas state with low temperature while absorbing a large amount of heat, so that the evaporator will become clod, and a fan of the indoor machine drives the indoor air through the evaporator, so cold wind is fed out by the indoor machine; and vapor in the air will be condensed into water drops while encountering the cold evaporator, and the water drops flows out through a water pipe, so the water will flow out of the air conditioner.

In a heating process, there is such a component referred to as a four-way valve so that the refrigerant flows in the condenser and the evaporator in an opposite direction to that in a refrigerating process, so the cold wind is fed out of the outdoor machine and the hot wind is fed out of the indoor machine in the heating process.

In the prior art, a home user typically uses a separated air conditioner instead of a centralized air conditioner, i.e., an air conditioner including an outdoor machine, and an indoor machine cooperating with the outdoor machine, and with the separated air conditioner in use, different air conditioners need to be arranged at different locations, e.g., an air conditioner is arranged in a sitting room, an air conditioner is arranged in a bedroom, and an air conditioner is arranged in a dining room. Each air conditioner is provided with a remote controller, and the user can control each air conditioner using the remote controller, e.g., power on the air conditioner, power off the air conditioner, adjustment temperature, etc.

The inventors of this application have found in making of technical solutions according to embodiments of the invention at least the following technical problems in the prior art.

With the centralized air conditioner in the prior art, although a plurality of indoor machines can be provided with heating or refrigerating by a plurality of outdoor machines assembled together, there is absent such a centralized control platform among a plurality of centralized air conditioners that the plurality of centralized air conditioners are networked and controlled, so there is such a technical problem that no centralized control can be performed effectively to distribute cold source or heat source among the respective centralized air conditioners as needed.

With the centralized air conditioner in the prior art, there are a plurality of compressors in the outdoor machine, so it is necessary to control lubricating oil to be distributed uniformly among the compressors, but the compressors have to be structurally altered more or less, or pipes for uniform distribution of the lubricating oil have to be connected among the compressors, in uniform lubricating oil distribution schemes in the prior art, so there is a technical problem of a complicated implementation of the schemes.

In the prior art, the respective separated air conditioners which are installed and operated separately can not be controlled centrally but have to be controlled separately in the prior art, so each air conditioner may have to be provided with its own control device, thus necessitating a large number of hardware or software resources, which may come with a waste of the resources and also become complicated to control.

The respective separated air conditioners in the prior art can not be networked for operation, and one outdoor machine can only provide one or more particular corresponding indoor machines with refrigerating or heating, but cold source or heat source can not be distributed as needed as a whole, which may result in a waste of the resources.

Moreover since the separated air conditioners in the prior art can not be networked for operation, if the outdoor machine in one of the separated air conditioners fails, then the indoor machines corresponding thereto may not be accessible although they can operate normally, due to the failure of their corresponding outdoor machine, thus underutilizing the resources.

SUMMARY

Embodiments of the invention provide an air conditioner system, a control system and an air conditioner controlling method so as to address such a technical problem in the prior art that with the separated air conditioner at home, each air conditioner has to be controlled and operated separately, so they may not be convenient to operate but have to be operated at high power consumption for a long period of time, an significant investment of moneys has to be made initially, a part of the outdoor machines may be left unused for a long period of time, thus resulting in a waste of the resources, etc. The technical solutions of the embodiment achieve the technical effects of centrally networking, controlling and operating the respective air conditioners, efficiently integrating the existing air conditioner resources at home, making it more convenient to control and operate the air conditioners, and operating the air conditioners efficiently at lower power consumption under various operating conditions to thereby improve the experience of a user and lower a cost of using the separated air conditioner.

An air conditioner system includes:

M outdoor machines configured to provide heat source or cold source, wherein M represents a positive integer;

N indoor machines configured to receive heat source or cold source provided by one or more of the at least one outdoor machines, wherein N represents a positive integer; and a control system including:

a lubricating oil distribution sub-system connected with the M outdoor machines;

a cold medium distribution sub-system connected with the M outdoor machines; and a control sub-system connected with the N indoor machines, the M outdoor machines, the lubricating oil distribution sub-system, and the cold medium distribution sub-system, wherein when the control sub-system receives a first control instruction for controlling one or more of the N indoor machines, the control sub-system executes the first control instruction to control the cold medium distribution sub-system to output a first amount of heat source or cold source corresponding to the first control instruction to the one or more indoor machines, and to control the lubricating oil distribution sub-system to maintain an amount of oil in each of one or more of the M outdoor machines, corresponding to the one or more indoor machines in a preset oil amount range.

Preferably the lubricating oil distribution sub-system includes a separator unit and a first valve unit, wherein:

the separator unit is configured to separate gas from liquid;

the first valve unit is configured to control heat source or cold source to be transmitted between the control system and the at least one indoor machine.

Preferably the separator unit includes a gas-liquid separator and an oil separator, and the first valve unit includes N first valves, M second valves, N third valves, M fourth valves, a fifth valve, a sixth valve, a seventh valve, an eighth valve, a ninth valve, a tenth valve, an eleventh valve, a twelfth valve and M sixteenth valves, wherein:

one end of each of the first valves is connected with one of the indoor machines, and the other end of each of the first valves is connected with a first end of one of the third valves;

one end of each of the second valves is connected with one of the outdoor machines, and the other end of each of the second valves is connected with one end of one of the sixteenth valves;

a third end of each of a first to (N−1)-th third valves among the N third valves is connected with a second end of a N-th third valve among the N third valves, and a third end of the N-th third valve among the N third valves is connected respectively with the gas-liquid separator and one end of the eighth valve;

a third end of each of a first to (M−1)-th fourth valves among the M fourth valves is connected with a second end of a M-th fourth valve among the M fourth valves, a third end of the M-th fourth valve among the M fourth valves is connected respectively with the oil separator, and one end of the fifth valve, and a first end of each of the M fourth valves is connected with the other end of the sixteenth valve;

the other end of the fifth valve is connected respectively with the oil separator, and one end of the ninth valve;

one end of the sixth valve is connected with the oil separator, and the other end of the sixth valve is connected with one end of the twelfth valve;

one end of the seventh valve is connected with the cold medium distribution sub-system, and the other end of the seventh valve is connected with one end of the eleventh valve;

the other end of the eighth valve is connected with the other end of the twelfth valve;

the other end of the ninth valve is connected respectively with the other end of the eleventh valve, and one end of the tenth valve; and the other end of the tenth valve is connected with the gas-liquid separator.

Preferably the cold medium distribution sub-system includes a second valve unit configured to control cold medium to be transmitted between the control system and the at least one indoor machine.

Preferably the second valve unit includes N thirteen valves, N fourteenth valves and M fifteenth valves, wherein one end of each of the N fourteenth valves is connected with one of the indoor machines, the other end of each of the N fourteenth valves is connected with one end of one of the thirteen valves, the other ends of the thirteen valves are all connected and are connected with one ends of the M fifteenth valves, and the other ends of the M fifteenth valves are connected respectively with ones of the outdoor machines.

Preferably the first control instruction is configured to control the one or more of the N indoor machines to be powered on or off, or the first control instruction is configured to control a wind direction, a rotation velocity of a fan, temperature and preset power-on time of the one or more of the N indoor machines.

Preferably the system further includes:

a detection module configured to detect one or more amounts of the oil in the one or more of the M outdoor machines; and the control sub-system is further configured, upon reception of the first control instruction, to execute the first control instruction to start the detection module, to obtain the one or more amounts of the oil in the one or more of the M outdoor machines detected by the detection module, and upon determining that there are P outdoor machines with the amounts of the oil above an upper limit of the preset oil amount range among the M outdoor machines, to generate and transmit a second control instruction to the corresponding P outdoor machines to instruct the P outdoor machines to lower operating frequencies so that the P outdoor machines discharge the excessive oil beyond the preset oil amount range to thereby balance the amounts of the oil stored in the M outdoor machines, wherein P represents an integer no less than 0 but less than M.

Preferably the detection module is further configured to detect the P outdoor machines to obtain a first detection result after the P outdoor machines are instructed to lower the operating frequencies; and the control sub-system is further configured to receive the first detection result, to judge from the first detection result whether the amount of the oil in each of the P outdoor machines reaches the upper limit of the preset oil amount range, and upon determining that the amount of the oil in each of the P outdoor machines reaches the upper limit of the preset oil amount range, to generate and transmit a third control instruction to the corresponding outdoor machines to instruct the corresponding outdoor machines to raise the operating frequencies.

Preferably the system further include a detection module configured to detect one or more amounts of the oil in the one or more of the M outdoor machines; and the control sub-system is further configured, upon reception of the first control instruction, to execute the first control instruction to start the detection module, to obtain the one or more amounts of the oil in the one or more of the M outdoor machines detected by the detection module, and upon determining that there are P outdoor machines with the amounts of the oil below a lower limit of the preset oil amount range among the M outdoor machines, to generate and transmit a third control instruction to the corresponding P outdoor machines to instruct the P outdoor machines to raise operating frequencies so that the P outdoor machines discharge the excessive oil beyond the preset oil amount range to thereby balance the amounts of the oil stored in the M outdoor machines, wherein P represents an integer no less than 0 but less than M.

Preferably the detection module is further configured to detect the P outdoor machines to obtain a first detection result after the P outdoor machines are instructed to raise the operating frequencies; and the control sub-system is further configured to receive the first detection result, to judge from the first detection result whether the amount of the oil in each of the P outdoor machines reaches the lower limit of the preset oil amount range, and upon determining that the amount of the oil in one or more of the P outdoor machines reaches the lower limit of the preset oil amount range, to generate and transmit a third control instruction to the corresponding outdoor machines to instruct the corresponding outdoor machines to lower the operating frequencies.

Preferably the system further includes a detection module configured to detect one or more contents of cold medium in the one or more of the M outdoor machines; and the control sub-system is further configured, upon reception of the first control instruction, to execute the first control instruction to start the detection module, to obtain the content of cold medium in the first one, and the content of cold medium in the second one, of the M outdoor machines, detected by the detection module, and upon determining that the content of cold medium in the first outdoor machine is less than the content of cold medium in the second outdoor machine, to generate and execute a fourth control instruction to control the cold medium distribution sub-system to input a second amount of cold medium to the first outdoor machine and to input a third amount of cold medium to the second outdoor machine, wherein the second amount is more than the third amount.

Preferably the air conditioner system further includes a detection module; and the control sub-system includes a reception module, a processing module and a transmission module, wherein:

the reception module is configured to receive the first control instruction;

the processing module is configured to execute the first control instruction to control the lubricating oil distribution subsystem and/or the cold medium distribution sub-system, to receive detection information transmitted by the detection module through the reception module, and to generate a corresponding control instruction according to the detection information; and the transmission module is configured to transmit the corresponding control instruction to corresponding one or more of the M outdoor machines.

Preferably the control sub-system further includes an input module connected with the processing module and configured to input the first control instruction in response to an operation by a user.

A control system includes:
a housing;
a circuit board arranged in the housing;
a lubricating oil distribution sub-system arranged on the circuit board and connected with M outdoor machines;
a cold medium distribution sub-system arranged on the circuit board and connected with the M outdoor machines;
a control sub-system arranged on the circuit board and connected with N indoor machines, the M outdoor machines, the lubricating oil distribution sub-system and the cold medium distribution sub-system; and
a power supply device arranged in the housing and configured to power the lubricating oil distribution sub-system, the cold medium distribution sub-system and the control sub-system.

Preferably the lubricating oil distribution sub-system includes a separator unit and a first valve unit, wherein:
the separator unit is configured to separate gas from liquid;
the first valve unit is configured to control heat source or cold source to be transmitted between the control system and the at least one indoor machine.

Preferably the cold medium distribution sub-system includes a second valve unit configured to control cold medium to be transmitted between the control system and the at least one indoor machine.

Preferably the control system further includes a detection module; and
the control sub-system includes a reception module, a processing module and a transmission module, wherein:
the reception module is configured to receive the first control instruction;
the processing module is configured to execute the first control instruction to control the lubricating oil distribution sub-system and/or the cold medium distribution sub-system, to receive detection information transmitted by the detection module through the reception module, and to generate a corresponding control instruction according to the detection information; and
the transmission module is configured to transmit the corresponding control instruction to corresponding one or more of the M outdoor machines.

An air conditioner controlling method, applicable to an air conditioner system including M outdoor machines, N indoor machines, and a control system including a lubricating oil distribution sub-system, a cold medium distribution sub-system and a control sub-system, includes the steps of:
receiving a first control instruction; and
executing the first control instruction to control the cold medium distribution sub-system to output a first amount of heat source or cold source corresponding to the first control instruction to the one or more indoor machines, and to control the lubricating oil distribution sub-system to maintain an amount of oil in each of one or more of the M outdoor machines, corresponding to the one or more indoor machines in a preset oil amount range.

Preferably the first control instruction is configured to control the one or more of the N indoor machines to be powered on or off, or the first control instruction is configured to control a wind direction, a rotation velocity of a fan, temperature and preset power-on time of the one or more of the N indoor machines.

Preferably the step of executing the first control instruction to control the cold medium distribution sub-system to output the first amount of heat source or the cold source corresponding to the first control instruction to the one or more indoor machines includes:

executing the first control instruction to start a detection module in the air conditioner system, and obtaining one or more amounts of the oil in the one or more of the M outdoor machines detected by the detection module;

upon determining that there are P outdoor machines with the amounts of the oil above an upper limit of the preset oil amount range among the M outdoor machines, generating a second control instruction; and transmitting the second control instruction to the corresponding P outdoor machines to instruct the P outdoor machines to lower operating frequencies so that the P outdoor machines discharge the excessive oil beyond the preset oil amount range to thereby balance the amounts of the oil stored in the M outdoor machines, wherein P represents an integer no less than 0 but less than M.

Preferably after the second control instruction is transmitted to the corresponding P outdoor machines to instruct the P outdoor machines to lower the operating frequencies, the method further includes the steps of:

detecting the P outdoor machines to obtain a first detection result;

judging from the first detection result whether the amount of the oil in each of the P outdoor machines reaches the upper limit of the preset oil amount range; and upon determining that the amount of the oil in one or more of the P outdoor machines reaches the upper limit of the preset oil amount range, generating and transmitting a third control instruction to the corresponding outdoor machines to instruct the corresponding outdoor machines to raise the operating frequencies.

Preferably the step of executing the first control instruction to control the cold medium distribution sub-system to output the first amount of the heat source or the cold source corresponding to the first control instruction to the one or more indoor machines includes:

executing the first control instruction to start a detection module in the air conditioner system, and obtaining one or more amounts of the oil in the one or more of the M outdoor machines detected by the detection module;

upon judging that there are P outdoor machines with the amounts of the oil below a lower limit of the preset oil amount range among the M outdoor machines, generating a third control instruction.

transmitting the third control instruction to the corresponding P outdoor machines to instruct the P outdoor machines to raise operating frequencies so that the P outdoor machines discharge the excessive oil beyond the preset oil amount range to thereby balance the amounts of the oil stored in the M outdoor machines, wherein P represents an integer no less than 0 but less than M.

Preferably after the third control instruction is transmitted to the corresponding P outdoor machines to instruct the P outdoor machines to raise the operating frequencies, the method further includes:

detecting the P outdoor machines to obtain a first detection result, judging from the first detection result whether the amount of the oil in each of the P outdoor machines reaches the lower limit of the preset oil amount range; and upon determining that the amount of the oil in one or more of the P outdoor machines reaches the lower limit of the preset oil amount range, generating and transmitting a third control instruction to the corresponding outdoor machines to instruct the corresponding outdoor machines to lower the operating frequencies.

Preferably after the first control instruction is received, the method further includes the steps of:

executing the first control instruction to start a detection module in the air conditioner system, and obtaining the content of cold medium in the first one, and the content of cold medium in the second one, of the M outdoor machines, detected by the detection module;

upon determining that the content of cold medium in the first outdoor machine is less than the content of cold medium in the second outdoor machine, generating a fourth control instruction; and executing the fourth control instruction to control the cold medium distribution sub-system to input a second amount of cold medium to the first outdoor machine and to input a third amount of cold medium to the second outdoor machine, wherein the second amount is more than the third amount.

An air conditioner system according to an embodiment of the invention includes: M outdoor machines configured to provide heat source or cold source, wherein M represents a positive integer; N indoor machines configured to receive heat source or cold source provided by one or more of the at least one outdoor machines, wherein N represents a positive integer; and a control system including: a lubricating oil distribution sub-system connected with the M outdoor machines; a cold medium distribution sub-system connected with the M outdoor machines; and a control sub-system connected with the N indoor machines, the M outdoor machines, the lubricating oil distribution sub-system, and the cold medium distribution sub-system, where when the control sub-system receives a first control instruction for controlling one or more of the N indoor machines, the control sub-system executes the first control instruction to control the cold medium distribution sub-system to output a first amount of heat source or cold source corresponding to the first control instruction to the one or more indoor machines, and to control the lubricating oil distribution sub-system to maintain the amount of oil in each of one or more of the M outdoor machines, corresponding to the one or more indoor machines in a preset oil amount range.

With one or more of the technical solutions according to the embodiments of the invention, at least the following technical effects can be achieved:

1. With the centralized air conditioner in the prior art, although a plurality of indoor machines can be provided with heating or refrigerating by a plurality of outdoor machines assembled together, there is absent such a centralized control platform among a plurality of centralized air conditioners that the plurality of centralized air conditioners are networked and controlled, so no centralized control can be performed. In the embodiment of the invention, the plurality of outdoor machines and the plurality of indoor machines are networked and provided with the centralized control module configured to control centrally the respective outdoor machines or indoor machines in the network to thereby distribute the cold source or the heat source uniformly to the respective outdoor machines as needed so as to improve the operating efficiency due to the centralized control.

2. With the centralized air conditioner in the prior art, there are a plurality of compressors in the outdoor machine, so it is necessary to control lubricating oil to be distributed uniformly among the compressors, but the compressors have to be structurally altered more or less, or pipes for uniform distribution of the lubricating oil have to be connected among the compressors, in uniform oil distribution schemes in the prior art, so the schemes may be complex to implement. In the technical solution according to the embodiment of the invention, the lubricating oil can be controlled by the control module to be distributed uniformly without any modification to the outdoor machines and the indoor machines and without any adjustment to the compressors in the outdoor machines, so the technical solution according to the invention can be applied to any air conditioner widely in a variety of fields and convenient to implement, thus simplifying the operation process.

3. In the prior art, the respective separated air conditioners which are installed and operated separately can not be controlled centrally but have to be controlled separately in the prior art, so each air conditioner may have to be provided with its own control device, thus necessitating a large number of hardware or software resources, which may come with a waste of the resources. In the embodiment of the invention, the plurality of networked indoor machines and/or outdoor machines can be equipped with the centralized control module, and the respective machines in the network can be controlled simply by the single control module instead of a number of control devices, thus saving the resources. Moreover general control can be performed by the single control module to thereby facilitate uniform distribution of the resources as needed as a whole so as to make reasonable use of the resources.

4. The respective separated air conditioners in the prior art can not be networked for operation, and one outdoor machine can only provide one or more particular corresponding indoor machines with refrigerating or heating, but cold source or heat source can not be distributed as needed as a whole. In the embodiment of the invention, the plurality of outdoor machines and the plurality of indoor machines can be networked and equipped with the centralized control module, and the control module can centrally control the respective outdoor machines or indoor machines in the network to thereby select correspondingly the outdoor machines matching the corresponding indoor machines, to distribute the cold resources or the hot resources as needed as a whole and to select the appropriate outdoor machines for the corresponding indoor machines according to particular power and other parameters thereof so as to match the power as much as possible to thereby save power consumption.

5. Since the separated air conditioners in the prior art can not be networked for operation, if the outdoor machine in one of the separated air conditioners fails, then the indoor machines corresponding thereto may not be accessible although they can operate normally, due to the failure of their corresponding outdoor machine. In the embodiment of the invention, the outdoor machines and the indoor machines in the plurality of separated air conditioners can be networked to enable the plurality of machines to be networked for operation, so that if one of the outdoor machines is damaged, then an indoor machine can be operated by selecting another outdoor machine, so that the corresponding indoor machine can be operated even if the outdoor machine fails, thus making use of the resources as much as possible without a waste of the resources.

6. In the embodiment of the invention, general control can be performed by the single control module, and the control module can detect the respective outdoor machines to determine the amounts of the oil in the respective outdoor machines, and when the amounts of the oil are imbalanced among the respective outdoor machines, the control module can control the oil to be distributed uniformly among the respective outdoor machines to thereby avoid some outdoor machine from being damaged due to excessive or insufficient oil.

In summary, in the embodiment of the invention, the plurality of outdoor machines and the plurality of indoor machines are connected with the control system, that is, the plurality of outdoor machines and the plurality of indoor machines are networked so that they can be centrally controlled by the control system, and the control system can control the amount of heat source, the amount of cold source or the amount of cold medium in the outdoor machines, and thus can control parameters of the indoor machines accordingly, e.g., wind directions, wind velocities, temperature, powering-on or powering-off, etc., of the indoor machines, in response to a received corresponding control instruction, so that the respective outdoor machines or indoor machines in the network can be controlled by the single control system to be operated conveniently and efficiently, and also the control system can have the corresponding outdoor machine or indoor machine operated at as low power consumption as possible under the same other conditions to thereby achieve an effect of saving power consumption and also simplify an operation process for a user.

DETAILED DESCRIPTION OF THE EMBODIMENTS

An embodiment of the invention provides an air conditioner system so as to address such a technical problem in the prior art that it is not convenient to operate the separated air conditioner at home and it has to take a long time to operate the separated air conditioner since each air conditioner at home has to be controlled and operated separately.

In order to address the technical problem above, a general idea of a technical solution according to an embodiment of the invention is as follows:

An air conditioner system is provided. The air conditioner includes: M outdoor machines configured to provide heat source or cold source, M represents a positive integer, N indoor machines configured to receive heat source or cold source provided by one or more of the at least one outdoor machines, N represents a positive integer; and a control system including: a lubricating oil distribution sub-system connected with the M outdoor machines; a cold medium distribution sub-system connected with the M outdoor machines; and a control sub-system connected with the N indoor machines, the M outdoor machines, the lubricating oil distribution sub-system, and the cold medium distribution sub-system; when the control sub-system receives a first control instruction for controlling one or more of the N indoor machines, the control sub-system executes the first control instruction to control the cold medium distribution sub-system to output a first amount of the heat source or the cold source corresponding to the first control instruction to the one or more indoor machines, and to control the lubricating oil distribution sub-system to maintain the amount of oil in each of one or more of the M outdoor machines, corresponding to the one or more indoor machines in a preset oil amount range.

That is, in the technical solution according to the embodiment of the invention, the plurality of outdoor machines and the plurality of indoor machines are connected with the control system, that is, the plurality of outdoor machines and the plurality of indoor machines are networked so that they can be centrally controlled by the control system. The control system can control the amounts of heat source, the amounts of cold source or the amounts of cold medium in the outdoor machines, and also can control parameters of the indoor machines accordingly. e.g., wind directions, wind velocities, temperature, powering-on or -off, etc., of the indoor machines, in response to a received corresponding control instruction. As can be apparent, it is possible to effectively address such a technical problem in the prior art that it is not convenient to operate the separated air conditioner at home and it has to take a long time to operate the separated air conditioner since each air conditioner at home has to be controlled and operated separately. Thus each outdoor machine or outdoor machines in the network can be controlled by the single control system to be operated conveniently and efficiently, and also the control system can have the corresponding outdoor machine or indoor machine operated at as low power consumption as possible under the same other conditions to thereby achieve an effect of saving power consumption and also simplify an operation process for a user.

In order to enable those skilled in the art to understanding more clearly and implement the invention, the technical solution according to the embodiment of the invention will be described below in details with reference to the drawings.

Figure 1:
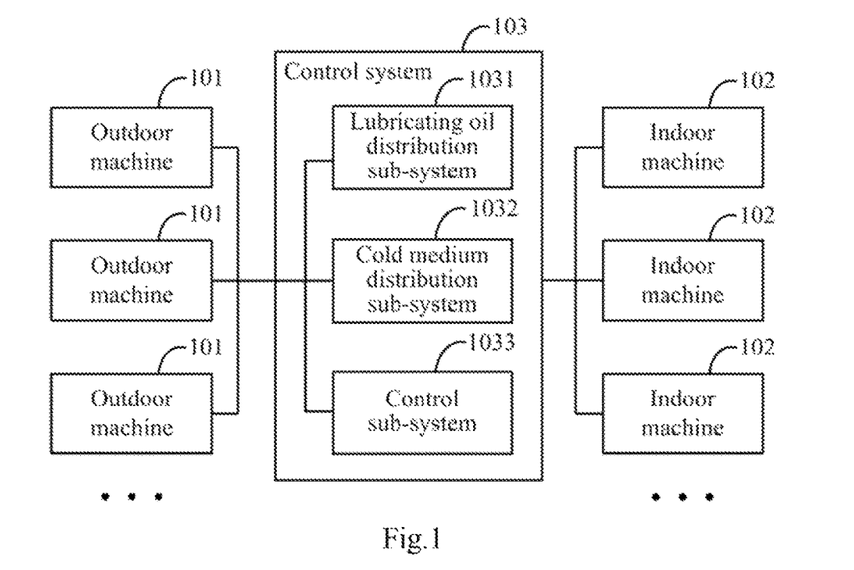
FIG. 1 illustrates a general structural diagram of an air conditioner system according to an embodiment of the invention.

Referring to FIG. 1, an air conditioner system according to an embodiment of the invention includes outdoor machines 101, indoor machines 102 and a control system 103. The air conditioner system can include M outdoor machines 101 and N indoor machines 102, both M and N represent positive integers.

Particularly the control system 103 in the embodiment of the invention can be located between the outdoor machines 101 and the indoor machines 102 and connected respectively with the outdoor machines 101 and the indoor machines 102; or the control system 103 can be located in any one of the outdoor machines 101, or the control system 103 can be located in any one of the indoor machines 102; or the control system 103 can be located elsewhere, and the invention will not be limited in this regard. FIG. 1 illustrates the control system 103 being located between the outdoor machines 101 and the indoor machines 102 as an example.

In the embodiment of the invention, the outdoor machines 101 and the indoor machines 102 can be outdoor machines 101 and indoor machines 102 in a separated air conditioner or can be outdoor machines 101 and indoor machines 102 in a centralized air conditioner. Each outdoor machine 101 in the embodiment of the invention may include only one compressor or may include a plurality of compressors.

The outdoor machines 101 can be configured to provide heat source or cold source.

The indoor machines 102 can be configured to receive heat source or cold source provided by one or more of the at least outdoor machines.

The control system 103 can include a lubricating oil distribution sub-system 1031, a cold medium distribution sub-system 1032 and a control sub-system 1033.

The lubricating oil distribution sub-system 1031 can be connected with the M outdoor machines 101, the cold medium distribution sub-system 1032 can be connected with the M outdoor machines 101, and the control sub-system 1033 can be connected with the M outdoor machines 101, the N indoor machines 102, the lubricating oil distribution sub-system 1031, and the cold medium distribution sub-system 1032.

Particularly when the control sub-system 1033 receives a first control instruction for controlling one or more of the N indoor machines 102, the control sub-system 1033 can execute the first control instruction to control the cold medium distribution sub-system 1032 to output a first amount of heat source or cold source corresponding to the first control instruction to the one or more indoor machines 102, and to control the lubricating oil distribution sub-system 1031 to maintain the amount of oil in each of one or more 101 of the M outdoor machines 101, corresponding to the one or more indoor machines 102 in a preset oil amount range.

Figure 2:
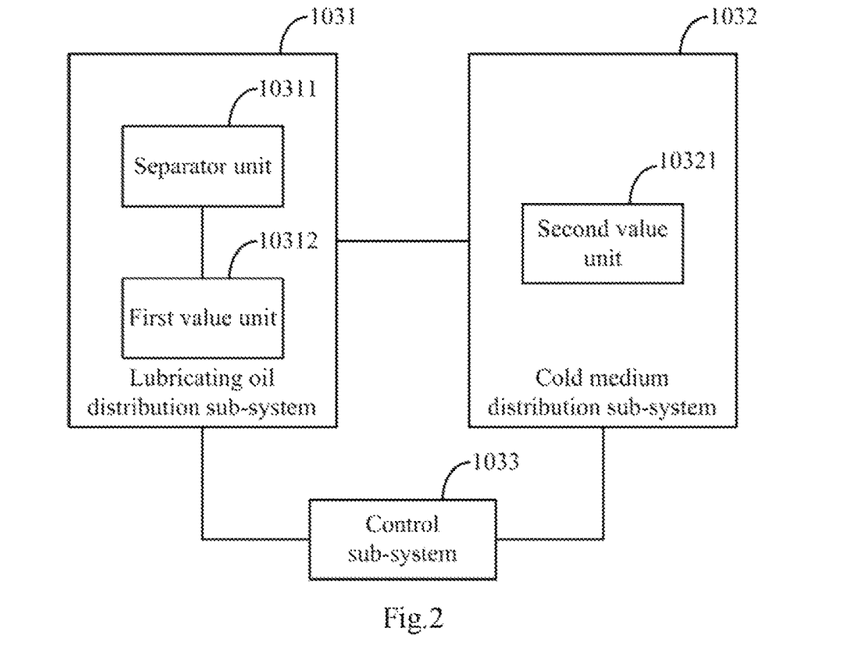
FIG. 2 illustrates a simplified schematic structural diagram of an air conditioner system according to an embodiment of the invention.

FIG. 2 illustrates a simplified schematic structural diagram of the control system 103 in the embodiment of the invention. The lubricating oil distribution sub-system 1031 in the embodiment of the invention can include a separator unit 10311 and a first valve unit 10312.

The separator unit 10311 can be configured to separate gas from liquid.

The first valve unit 10312 can be configured to control heat source or cold source to be transmitted between the control system 103 and the at least one indoor machine 101.

The cold medium distribution sub-system 1032 can include a second valve unit 10321 which can be configured to control cold medium to be transmitted between the control system 103 and the at least one indoor machine 101.

Figure 3:
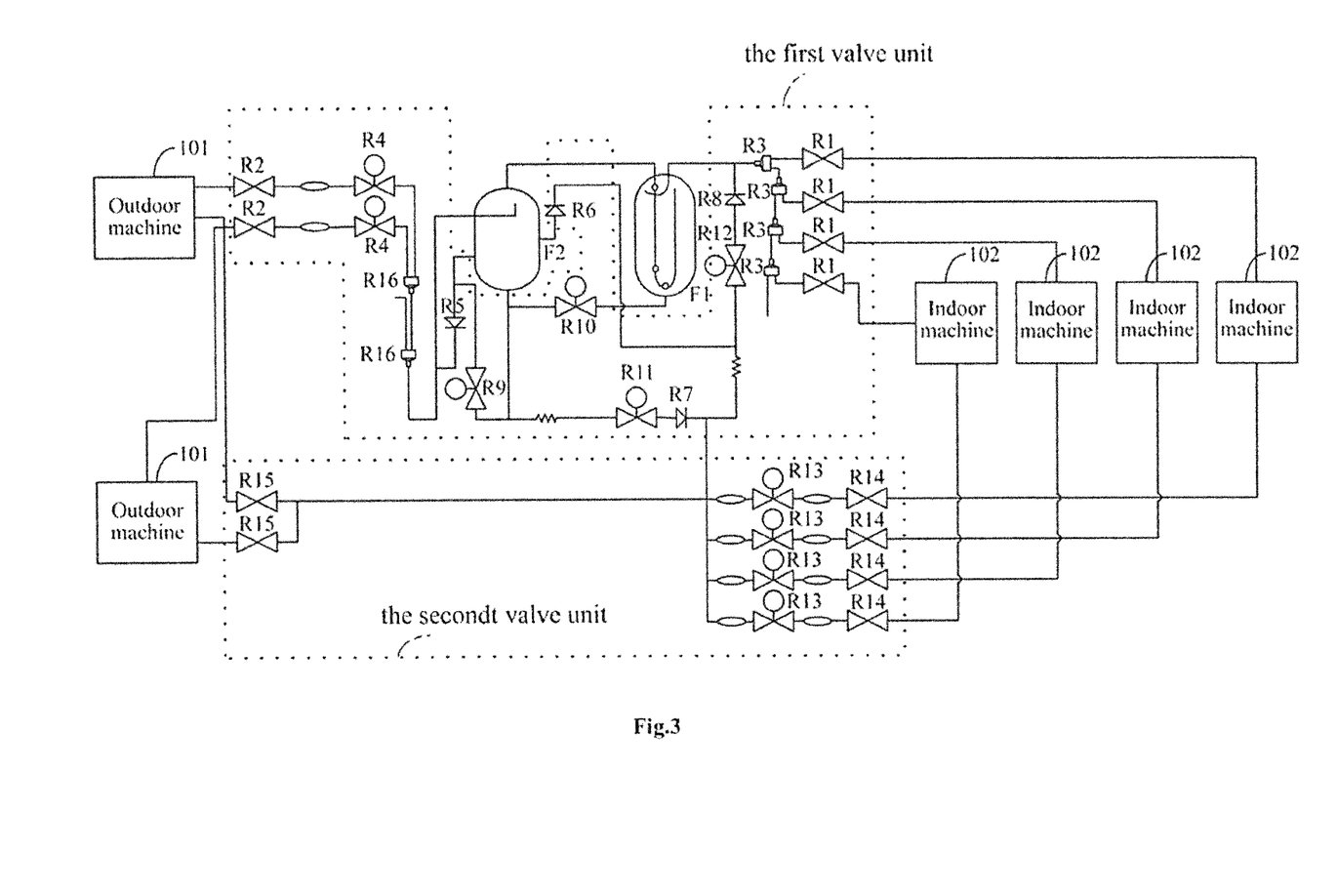
FIG. 3 illustrates a general structural diagram of an air conditioner system according to an embodiment of the invention.

As illustrated in FIG. 3, the separator unit 10311 in the embodiment of the invention can include a gas-liquid separator F1 and an oil separator F2, and the first valve unit 10312 can include N first valves R1, M second valves R2, N−1 third valves R3, M fourth valves R4, a fifth valve R5, a sixth valve R6, a seventh valve R7, an eighth valve R8, a ninth valve R9, a tenth valve R10, an eleventh valve R11 and a twelfth valve R12. FIG. 3 illustrates the air conditioner system including two outdoor machines 101 and four indoor machines 102 as an example, in which:

One end of each first valve R1 is connected with one of the indoor machines 102, and the other end of each first valve R1 is connected with a first end of one of the third valves R3.

One end of each second valve R2 is connected with one of the outdoor machines 101, and the other end of each second valve R2 is connected with one end of one of sixteenth valves R16.

A third end of each of the first to (N−1)-th third valves R3 among the N third valves R3 is connected with a second end of the N-th third valve R3 among the N third valves R3, and a third end of the N-th third valve R3 among the N third valves R3 is connected respectively with the gas-liquid separator F1 and one end of the eighth valve R8.

A third end of each of the first to (M−1)-th fourth valves R4 among the M fourth valves R4 is connected with a second end of the M-th fourth valve R4 among the M fourth valves R4, a third end of the MN-th fourth valve R4 among the M fourth valves R4 is connected respectively with the oil separator F2 and one end of the fifth valve R5, and a first end of each of the M fourth valves R4 is connected with the other end of the sixteenth valve R16.

The other end of the fifth valve R5 is connected with the oil separator F2, and one end of the ninth valve R9.

One end of the sixth valve R6 is connected with the oil separator F2, and the other end of the sixth valve R6 is connected with one end of the twelfth valve R12.

One end of the seventh valve R7 is connected with the cold medium distribution sub-system 1032, and the other end of the seventh valve R7 is connected with one end of the eleventh valve R11.

The other end of the eighth valve R5 is connected with the other end of the twelfth valve R12.

The other end of the ninth valve R9 is connected respectively with the other end of the eleventh valve R11, and one end of the tenth valve R10.

The other end of the tenth valve R10 is connected with the gas-liquid separator F1.

Particularly in the embodiment of the invention, the first valves R1 can be stop valves, the second valves R2 can be stop valves, the third valves R3 can be diverter valves, the fourth valves R4 can be two-way valves (electromagnetic valves), the sixteenth valves R16 can be diverter valves, the fifth valve R5 can be a one-way valve, the sixth valve R6 can be a one-way valve, the seventh value R7 can be a one-way valve, the eighth valve R8 can be a one-way valve, the ninth valve R9 can be a two-way valve, the tenth valve R10 can be a two-way valve, the eleventh valve R11 can be a two-way valve, the twelfth valve R12 can be a two-way valve, thirteenth valves R13 can be electronic expansion valves, fourteenth valves R14 can be stop valves, and fifteenth valves R15 can be stop valves. The electronic expansion valves can be opened differently so that when the electronic expansion valves are more opened, they can pass a larger amount of cold medium or oil, and when the electronic expansion valves are less opened, they can pass a smaller amount of cold medium or oil, so the amounts of cold medium entering the corresponding the indoor machines 102 can be controlled by controlling the corresponding electronic expansion valves.

In FIG. 3, the second valve unit 10321 can include N thirteen valves R13, N fourteenth valves R14 and M fifteenth valves R15.

Particularly one end of each of the N fourteenth valves R14 is connected with one of the indoor machines 102, the other end of each of the N fourteenth valves R14 is connected with one end of one of the thirteen valves R13, the other ends of the thirteen valves R13 are all connected and are connected with one ends of the M fifteenth valves R15, and the other ends of the M fifteenth valves R15 are connected respectively with ones of the outdoor machines 101.

Particularly the control system 103 is not illustrated in FIG. 3, and FIG. 3 illustrates the air conditioner system including three indoor machines 102 and two outdoor machines 101. If the number of outdoor machines 101 is changed and/or the number of three indoor machines 102 is changed, then those skilled in the art shall naturally know how to make a variation thereto according to the idea of the invention.

A refrigerating process of the air conditioner system will be described as follow:

One or more of the indoor machines 102 transmit the cold medium in the gas state to the gas-liquid separator F1 through one or more of the N first valves R1, gas and liquid in the cold medium is separated from each other by the gas-liquid separator F1, the separated cold medium in the gas state enters the oil separator F2, the oil separator F2 separates lubricating oil possibly present in the cold medium in the gas state, the separated lubricating oil can enter corresponding one or more of the outdoor machines 101 via the ninth valve R9, the fifth valve R5 and one or more of the M second valves R2, and the cold medium in the gas state separated by the oil separator F2 enters the corresponding one or more outdoor machines 101 via one or more of the M fourth valves R4 and one or more of the M second valves R2. In the one or more outdoor machines 101, the cold medium in the gas state can be compressed by the compressors in the one or more outdoor machines 101 into the cold medium in the liquid state with high temperature and high pressure, and the one or more corresponding outdoor machines 101 can have the compressed cold medium entered the corresponding one or more operating indoor machines 102 through one or more of the M fifteenth valves R15, one or more of the N thirteenth valves R13 and one or more of the N fourteenth valves R14. When the cold medium in the liquid state enters the indoor machines 102, the space thereof suddenly becomes larger and thus the pressure thereof becomes lower, and the cold medium in the liquid state will be gasified. The medium being changed from the liquid state to the gas state absorbs heat, so the medium being gasified absorbs a large amount of heat, and the indoor machines 102 will become cold, and since the fans of the indoor machines 102 drive the indoor air through the indoor machines 102, the cold wind is fed out of the indoor machines 102, thus achieving the effect of refrigerating by the air conditioner system. Then the cold medium in the gas state continues with being cycled in the same way.

Particularly the tenth valve R10 is closed in the refrigerating process.

The oil separator F2 is configured with a height limit, and the lubricating oil above the height limit is excessive lubricating oil which will flow out via the fifth valve R5 and enter the outdoor machines 101 together with the cold medium in the gas state.

Particularly in the embodiment of the invention, a capillary is arranged between the oil separator F2 and the eleventh valve R11 (that is, between the ninth valve R9 and the eleventh valve R11).

A heating process of the air conditioner system will be described as follow:

One or more of the outdoor machines 101 compress the cold medium in the gas state into the cold medium in the gas state with high temperature and high pressure, and then the one or more outdoor machines 101 compressing the cold medium have the compressed cold medium with high temperature and high pressure enter the oil separator F2 via one or more of the M second valves R2 and one or more of the M fourth valves R4, the oil and the cold medium in the gas state is separated from each other in the oil separator F2, the separated lubricating oil can enter the corresponding one or more outdoor machines 101 via the eleventh valve R11, the seventh valve R7 and one or more of the M fifteenth valve R15, the separated cold medium in the gas state enters the gas-liquid separator F1, and liquid and gas possibly contained in the cold medium in the gas state is separated from each other in the gas-liquid separator F1. In the heating process, the tenth valve R10 is opened, the separated liquid can enter the corresponding one or more outdoor machines 101 via the tenth valve R10, the eleventh valve R11, the seventh valve R7 and one or more of the M fifteenth valve R15, and the separated gas can enter the corresponding one or more outdoor machines 101 via one or more of the N−1 third valves R3 and one or more of the N first valves R1. When the cold medium in the gas state enter the indoor machines 102, and the cold medium in the gas state will be liquefied. The medium being changed from the gas state into the liquid state radiates heat, so the cold medium being liquefied releases a large amount of heat, so the indoor machines 102 will become heat, and since the fans of the indoor machines 102 drive the indoor air through the indoor machines 102, the hot wind is fed out of the indoor machines 102, thus achieving the effect of heating by the air conditioner system. Then the cold medium in the liquid state continues with being cycled in the same way.

Particularly a temperature sensor can be arranged between the eighth valve R8 and the third valves R3 or between the eighth valve R8 and the twelfth valve R2, the temperature sensor is configured to detect the temperature to thereby determine whether there is insufficient lubricating oil in the system, although the temperature sensor is not illustrated in FIG. 3.

Particularly the oil separator F2 may be configured with a height limit, and the lubricating oil above the height limit is excessive lubricating oil, and after the oil and the cold medium is separated from each other by the oil separator F2, if the remaining lubricating oil exceeds the height limit of the oil separator F2, then the remaining lubricating oil will enter the corresponding outdoor machines 101 via the sixth valve R6 and one or more of the M fifteenth valve R15. In the embodiment of the invention, a capillary is arranged between the twelfth valve R12 and the seventh valve R7.

In the embodiment of the invention, the control system 103 can receive the first control instruction for controlling one or more of the N indoor machines 102 to be powered on or off or for controlling a wind direction, rotation velocity of the fan, temperature, preset power-on time or preset power-off time, etc., of one or more of the N indoor machines 102.

Figure 4:
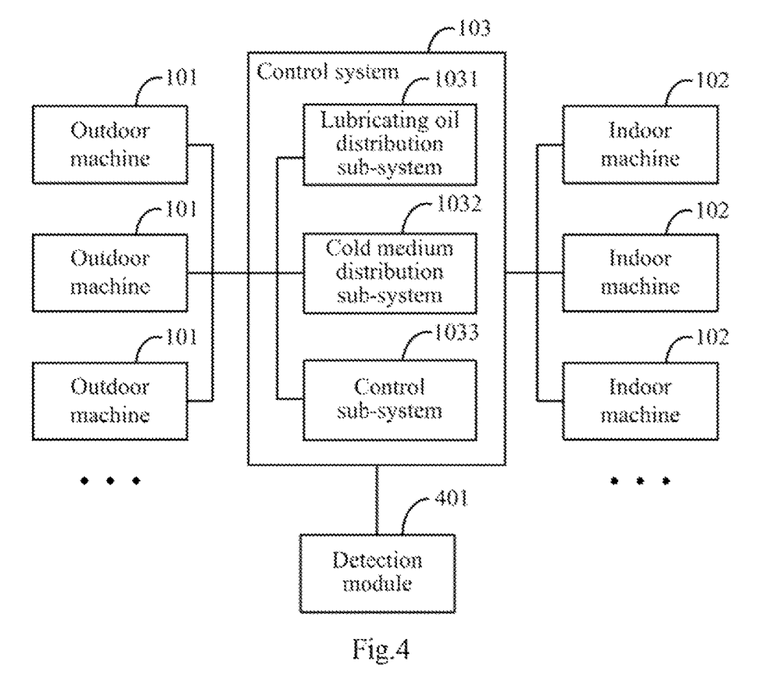
FIG. 4 illustrates a detailed structural diagram of an air conditioner system according to an embodiment of the invention.

Referring to FIG. 4, the air conditioner system can further include a detection module 401 configured to detect one or more amounts of the oil in one or more of the M outdoor machines 101.

The control sub-system 1033 can be further configured, upon reception of the first control instruction, to execute the first control instruction to start the detection module 401, to obtain the one or more amounts of the oil in the one or more of the M outdoor machines 101 detected by the detection module 401, to judge from the obtained one or more amounts of the oil in the one or more of the M outdoor machines 101 whether there are P outdoor machines 101 with the amounts of oil above an upper limit of the preset oil amount range among the M outdoor machines 101, and upon determining that there are P outdoor machines 101 with the amounts of oil above the upper limit of the preset oil amount range among the M outdoor machines 101, to generate and transmit a second control instruction to the corresponding P outdoor machines 101 to instruct the P outdoor machines 101 to lower operating frequencies so that the P outdoor machines 101 discharge the excessive oil beyond the preset oil amount range to thereby balance the amounts of oil stored in the M outdoor machines 101, P represents an integer no less than 0 but less than M.

The detection module 401 can be further configured to detect the P outdoor machines 101 to obtain a first detection result after the control sub-system 1033 instructs the P outdoor machines 101 to lower the operating frequencies.

The control sub-system 1033 can be further configured to receive the first detection result, to judge from the first detection result whether the amount of oil in each of the P outdoor machines 101 reaches the upper limit of the preset oil amount range, and upon determining that the amount of oil in each of the P outdoor machines 101 reaches the upper limit of the preset oil amount range, to generate and transmit a third control instruction to the corresponding outdoor machines 101 to instruct the corresponding outdoor machines 101 to raise the operating frequencies.

The control sub-system 1033 can be further configured, upon reception of the first control instruction, to execute the first control instruction to start the detection module 401, to obtain the one or more amounts of oil in the one or more of the M outdoor machines 101 detected by the detection module 401, and upon determining that there are P outdoor machines 101 with the amounts of oil below a lower limit of the preset oil amount range among the M outdoor machines 101, to generate and transmit a third control instruction to the corresponding P outdoor machines 101 to instruct the P outdoor machines 101 to raise operating frequencies so that the P outdoor machines 101 discharge the excessive oil beyond the preset oil amount range to thereby balance the amounts of oil stored in the M outdoor machines 101, P represents an integer no less than 0 but less than M.

The detection module 401 can be further configured to detect the P outdoor machines 101 to obtain a first detection result after the control sub-system 1033 instructs the P outdoor machines 101 to raise the operating frequencies.

The control sub-system 1033 can be further configured to receive the first detection result, to judge from the first detection result whether the amount of oil in each of the P outdoor machines 101 reaches the lower limit of the preset oil amount range, and upon determining that the amount of the oil in each of the P outdoor machines 101 reaches the lower limit of the preset oil amount range, to generate and transmit the third control instruction to the corresponding outdoor machines 101 to instruct the corresponding outdoor machines 101 to lower the operating frequencies.

The detection module 401 can be further configured to detect one or more contents of cold medium in one or more of the M outdoor machines 10.

The control sub-system 1033 can be further configured, upon reception of the first control instruction, to execute the first control instruction to start the detection module 401, to obtain the content of cold medium in the first one, and the content of cold medium in the second one, of the M outdoor machines 101, detected by the detection module 401, and upon determining that the content of cold medium in the first outdoor machine is less than the content of cold medium in the second outdoor machine, to generate and execute a fourth control instruction to control the cold medium distribution sub-system to input a second amount of cold medium to the first outdoor machine and to input a third amount of cold medium to the second outdoor machine, the second amount is more than the third amount.

In the embodiment of the invention, the control sub-system 1033 can particularly include a reception module, a processing module and a transmission module.

The reception module can be configured to receive the first control instruction.

The processing module is configured to execute the first control instruction to control the lubricating oil distribution sub-system 1031 and/or the cold medium distribution sub-system 1032, to receive detection information transmitted by the detection module 401 through the reception module, and to generate a corresponding control instruction according to the detection information.

The transmission module is configured to transmit the corresponding control instruction to corresponding one or more of the M outdoor machines 101.

In the embodiment of the invention, the control sub-system 1033 can further include an input module configured to transmit the first control instruction to the reception module in response to an operation by the user.

An embodiment of the invention further provides a control system including: a housing; a circuit board arranged in the housing; a lubricating oil distribution sub-system 1031 arranged on the circuit board and connected with M outdoor machines 101; a cold medium distribution sub-system 1032 arranged on the circuit board and connected with the M outdoor machines 101; a control sub-system 1033 arranged on the circuit board and connected with the M outdoor machines 101, N indoor machines 102, the lubricating oil distribution sub-system 1031 and the cold medium distribution sub-system 1032; and a power supply device arranged in the housing and configured to power the lubricating oil distribution sub-system 1031, the cold medium distribution sub-system 1032 and the control sub-system 1033. That is, the control system according to the embodiment of the invention can include the air conditioner system.

Figure 5:
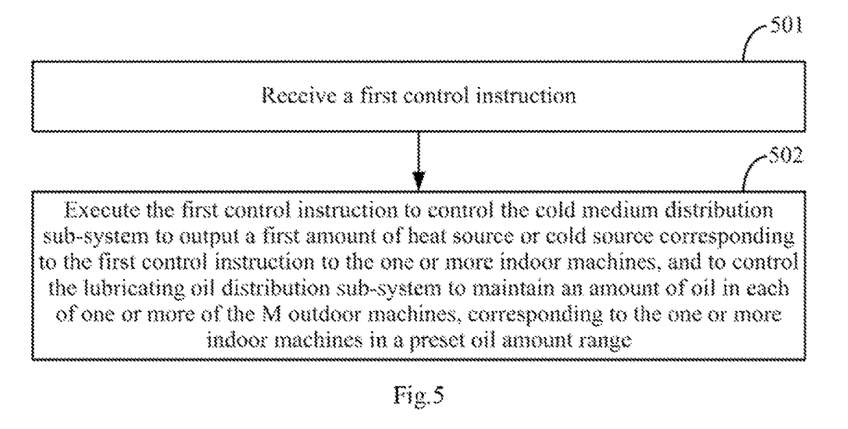
FIG. 5 illustrates a general flow chart of an air conditioner controlling method according to an embodiment of the invention.

Referring to FIG. 5, an embodiment of the invention further provides an air conditioner controlling method which can be applicable to the air conditioner system, and a general flow of the method is as follows:

The operation 501 is to receive a first control instruction.

The control sub-system 1033 can receive the first control instruction which can be transmitted directly by a user or can be generated by an input module as a result of an operation by the user.

For example, if the user performs a first operation through a handheld device connected with the control sub-system 1033, then the user performs the first operation so that the control sub-system 1033 receives the first control instruction. Alternatively if the user performs the first operation through an electronic device connected with the control sub-system 1033, then the input module included in the control sub-system 1033 can generate the first control instruction as a result of the first operation so that the control sub-system 1033 receives the first control instruction.

In the embodiment of the invention, the first control instruction can be configured to control one or more of the N indoor machines 102 to be powered on or off, or the first control instruction can be configured to control a wind direction, a rotation velocity of fan, temperature, preset power-on time or preset power-off time, etc., of one or more of the N indoor machines 102.

The operation 502 is to execute the first control instruction to control the cold medium distribution sub-system 1032 to output a first amount of heat source or cold source corresponding to the first control instruction to the one or more indoor machines 102, and to control the lubricating oil distribution sub-system 1031 to maintain the amount of the oil in each of one or more 101 of the M outdoor machines 101, corresponding to the one or more indoor machines 102 in a preset oil amount range.

1. The control sub-system 1033 can execute the first control instruction to start the detection module 401 to detect one or more amounts of the oil in the one or more of the M outdoor machines 101, and to obtain the one or more amounts of the oil in the one or more of the M outdoor machines 101 detected by the detection module 401.

If it is determined that there are P outdoor machines 101 with the amounts of oil above an upper limit of the preset oil amount range among the M outdoor machines 101, then a second control instruction can be generated.

The second control instruction can be transmitted to the corresponding P outdoor machines 101 to instruct the P outdoor machines 101 to lower operating frequencies so that the P outdoor machines 101 discharge the excessive oil beyond the preset oil amount range to thereby balance the amounts of oil stored in the M outdoor machines 101, P represents an integer no less than 0 but less than M.

In the embodiment of the invention, the detection module 401 can further detect the P outdoor machines 101 to obtain a first detection result after the second control instruction is transmitted to the corresponding P outdoor machines 101 to instruct the P outdoor machines 101 to lower the operating frequencies.

The control sub-system 1033 can judge from the first detection result whether the amount of oil in each of the P outdoor machines 101 reaches the upper limit of the preset oil amount range.

Upon determining that the amount of oil in each of the P outdoor machines 101 reaches the upper limit of the preset oil amount range, the control sub-system 1033 can generate and transmit a third control instruction to the corresponding outdoor machines 101 to instruct the corresponding outdoor machines 101 to raise the operating frequencies.

That is, if there are detected outdoor machines 101 with excessive oil, then the operating frequencies of the outdoor machines 101 with the excessive of oil can be lowered accordingly so that these outdoor machines 101 can discharge the excessive oil, and the discharged oil can enter directly the other outdoor machines 101 with higher operating frequencies or can be cycled after entering the corresponding indoor machines 102 to thereby avoid them from being easily damaged due to the large amount of oil contained in the outdoor machines 101.

2. The control sub-system 1033 can execute the first control instruction to start the detection module 401 to detect one or more amount of oil in one or more of the M outdoor machines 101, and to obtain the one or more amounts of oil in the one or more of the M outdoor machines 101 detected by the detection module 401.

Upon determining that there are P outdoor machines 101 with the amounts of oil below a lower limit of the preset oil amount range among the M outdoor machines 101, the control sub-system 1033 can generate a third control instruction.

The third control instruction can be transmitted to the corresponding P outdoor machines 101 to instruct the P outdoor machines 101 to raise operating frequencies so that the P outdoor machines 101 discharge the excessive oil beyond the preset oil amount range to thereby balance the amounts of the oil stored in the M outdoor machines 101, P represents an integer no less than 0 but less than M.

In the embodiment of the invention, the detection module 401 can further detect the P outdoor machines 101 to obtain a first detection result after the third control instruction is transmitted to the corresponding P outdoor machines 101 to instruct the P outdoor machines 101 to raise the operating frequencies.

The control sub-system 1033 can judge from the first detection result whether the amount of oil in each of the P outdoor machines 101 reaches the lower limit of the preset oil amount range.

Upon determining that the amount of oil in each of the P outdoor machines 101 reaches the lower limit of the preset oil amount range, the control sub-system 1033 can generate and transmit a third control instruction to the corresponding outdoor machines 101 to instruct the corresponding outdoor machines 101 to lower the operating frequencies.

That is, if there are detected outdoor machines 101 with insufficient amounts of oil, then the operating frequencies of the outdoor machines 101 with larger amounts of oil can be raised accordingly so that these outdoor machines 101 can draw oil transmitted from the other outdoor machines 101 or the indoor machines 102 to thereby avoid them from being easily damaged due to the insufficient amounts of oil contained in the outdoor machines 101.

3. The control sub-system 1033 can execute the first control instruction to start the detection module 401 to detect the contents of cold medium in the one or more of the M outdoor machines 101, and to obtain the content of cold medium in the first one, and the content of cold medium in the second one, of the M outdoor machines 101, detected by the detection module 401.

Upon determining that the content of cold medium in the first outdoor machine is less than the content of cold medium in the second outdoor machine, the control sub-system 1033 can generate a fourth control instruction.

The sub-system 1033 can execute the fourth control instruction to control the cold medium distribution sub-system to input a second amount of cold medium to the first outdoor machine and a third amount of cold medium to the second outdoor machine, the second amount is more than the third amount.

That is, if it is detected that there is imbalance in contents of cold medium among two or more of the outdoor machines 101, then the cold medium can be balanced among the two or more outdoor machines 101 so that there is an as uniform content of cold medium as possible in each outdoor machine 101 to thereby avoid the contents of cold medium in the respective outdoor machines 101 from being imbalanced.

In the embodiment of the invention, the outdoor machines 101 and the indoor machines 102 in the same network can be controlled by the control system 103.

For example, there are two indoor machines 102, each of which is 1.5P, and two outdoor machines 101, one of which is 1.5P, and the other of which is 3P, in the network. If the user chooses to start one of the indoor machines 102, then the control system 103 may choose to start the outdoor machine 101 with 1.5P but may not start the other outdoor machine 101 with 3P; and if the user chooses to start both of the indoor machines 102, then the control system may choose to start the outdoor machine 101 with 3P but may not start the other outdoor machine 101 with 1.5P, thus achieving the effect of saving power consumption as much as possible.

In another example, if there are three indoor machines 102, each of which is 1.5P, and two outdoor machines 101, one of which is 1.5P, and the other of which is 3P, in the network. If the user chooses to start one of the indoor machines 102, then the control system 103 may choose to start the outdoor machine 101 with 1.5P but may not start the other outdoor machine 101 with 3P; if the user chooses to start two of the indoor machines 102, then the control system may choose to start the outdoor machine 101 with 3P but may not start the other outdoor machine 101 with 1.5P; and if the user chooses to start all the three indoor machines 102, then the control system 103 may start both the outdoor machines 101.

Preferably when there are a plurality of indoor machines 102 and/or a plurality of outdoor machines 101 in the network, for one of the indoor machines 102 to be started as chosen by the user, the control system 103 can determine in a corresponding algorithm one or more of the outdoor machines 101 to provide heat source or cold source for the indoor machine 102 to be started, for example, if the control system determines some indoor machines 101 to be more energy-saving, then the control system can control these indoor machines 101 to be started.

Particularly the control system 103 can control the corresponding indoor machines 101 and/or indoor machines 102 by controlling the corresponding valves. For example, if the control system 103 needs to control a larger amount of cold medium to flow into the indoor machine A and a less amount of cold medium to flow into the indoor machine B, then the control system 103 can control the third thirteenth valve R13 corresponding to the indoor machine A to be more opened and the third thirteenth valve R13 corresponding to the indoor machine B to be less opened so that a larger amount of cold medium flows into the indoor machine A via the third thirteenth valve R13, and a less amount of cold medium flows into the indoor machine B, via the third thirteenth valve R13.

An air conditioner system according to an embodiment of the invention includes: M outdoor machines 101 configured to provide heat source or cold source, M represents a positive integer; N indoor machines 102 configured to receive heat source or cold source provided by one or more of the at least one outdoor machines 101, N represents a positive integer; and a control system including: a lubricating oil distribution sub-system 1031 connected with the M outdoor machines 101; a cold medium distribution sub-system 1032 connected with the M outdoor machines 101; and a control sub-system 1033 connected with the N indoor machines 102, the M outdoor machines 101, the lubricating oil distribution sub-system 1031, and the cold medium distribution sub-system 1032. When the control sub-system 1033 receives a first control instruction for controlling one or more of the N indoor machines 102, the control sub-system 1033 executes the first control instruction to control the cold medium distribution sub-system 1032 to output a first amount of heat source or cold source corresponding to the first control instruction to the one or more indoor machines 103, and to control the lubricating oil distribution sub-system 1031 to maintain the amount of oil in each of one or more of the M outdoor machines 101, corresponding to the one or more indoor machines 102 in a preset oil amount range.

With one or more of the technical solutions according to the embodiments of the invention, at least the following technical effects can be achieved:

1. With the centralized air conditioner in the prior art, although a plurality of indoor machines can be provided with heating or refrigerating by a plurality of outdoor machines assembled together, there is absent such a centralized control platform among a plurality of centralized air conditioners that the plurality of centralized air conditioners are networked and controlled, so no centralized control can be performed. In the embodiment of the invention, the plurality of outdoor machines and the plurality of indoor machines are networked and provided with the centralized control module configured to control centrally the respective outdoor machines or indoor machines in the network to thereby distribute the cold source or the heat source uniformly to the respective outdoor machines as needed so as to improve the operating efficiency due to the centralized control.

2. With the centralized air conditioner in the prior art, there are a plurality of compressors in the outdoor machine, so it is necessary to control lubricating oil to be distributed uniformly among the compressors, but the compressors have to be structurally altered more or less, or pipes for uniform distribution of the lubricating oil have to be connected among the compressors, in uniform oil distribution schemes in the prior art, so the schemes may be complex to implement. In the technical solution according to the embodiment of the invention, the lubricating oil can be controlled by the control module to be distributed uniformly without any modification to the outdoor machines and the indoor machines and without any adjustment to the compressors in the outdoor machines, so the technical solution according to the invention can be applied to any air conditioner widely in a variety of fields and convenient to implement, thus simplifying the operation process.

3. In the prior art, the respective separated air conditioners which are installed and operated separately can not be controlled centrally but have to be controlled separately in the prior art, so each air conditioner may have to be provided with its own control device, thus necessitating a large number of hardware or software resources, which may come with a waste of the resources. In the embodiment of the invention, the plurality of networked indoor machines and/or outdoor machines can be equipped with the centralized control module, and the respective machines in the network can be controlled simply by the single control module instead of a number of control devices, thus saving the resources. Moreover general control can be performed by the single control module to thereby facilitate uniform distribution of the resources as needed as a whole so as to make reasonable use of the resources.

4. The respective separated air conditioners in the prior art can not be networked for operation, and one outdoor machine can only provide one or more particular corresponding indoor machines with refrigerating or heating, but cold source or heat source can not be distributed as needed as a whole. In the embodiment of the invention, the plurality of outdoor machines and the plurality of indoor machines can be networked and equipped with the centralized control module, and the control module can centrally control the respective outdoor machines or indoor machines in the network to thereby select correspondingly the outdoor machines matching the corresponding indoor machines, to distribute the cold resources or the hot resources as needed as a whole and to select the appropriate outdoor machines for the corresponding indoor machines according to particular power and other parameters thereof so as to match the power as much as possible to thereby save power consumption.

5. Since the separated air conditioners in the prior art can not be networked for operation, if the outdoor machine in one of the separated air conditioners fails, then the indoor machines corresponding thereto may not be accessible although they can operate normally, due to the failure of their corresponding outdoor machine. In the embodiment of the invention, the outdoor machines and the indoor machines in the plurality of separated air conditioners can be networked to enable the plurality of machines to be networked for operation, so that if one of the outdoor machines is damaged, then an indoor machine can be operated by selecting another outdoor machine, so that the corresponding indoor machine can be operated even if the outdoor machine fails, thus making use of the resources as much as possible without a waste of the resources.

6. In the embodiment of the invention, general control can be performed by the single control module, and the control module can detect the respective outdoor machines to determine the amounts of the oil in the respective outdoor machines, and when the amounts of the oil are imbalanced among the respective outdoor machines, the control module can control the oil to be distributed uniformly among the respective outdoor machines to thereby avoid some outdoor machine from being damaged due to excessive or insufficient oil.

In summary, in the embodiment of the invention, the plurality of outdoor machines and the plurality of indoor machines are connected with the control system, that is, the plurality of outdoor machines and the plurality of indoor machines are networked so that they can be centrally controlled by the control system, and the control system can control the amount of heat source, the amount of cold source or the amount of cold medium in the outdoor machines, and thus can control parameters of the indoor machines accordingly, e.g., wind directions, wind velocities, temperature, powering-on or -off, etc., of the indoor machines, in response to a received corresponding control instruction, so that the respective outdoor machines or indoor machines in the network can be controlled by the single control system to be operated conveniently and efficiently, and also the control system can have the corresponding outdoor machine or indoor machine operated at as low power consumption as possible under the same other conditions to thereby achieve an effect of saving power consumption and also simplify an operation process for the user.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. An air conditioner system, comprising:
M outdoor machines configured to provide heat source or cold source, wherein M represents a positive integer;
N indoor machines configured to receive heat source or cold source provided by one or more of the at least one outdoor machines, wherein N represents a positive integer; and
a control system comprising:
a lubricating oil distribution sub-system connected with the M outdoor machines;
a cold medium distribution sub-system connected with the M outdoor machines; and
a control sub-system connected with the N indoor machines, the M outdoor machines, the lubricating oil distribution sub-system, and the cold medium distribution sub-system,
wherein when the control sub-system receives a first control instruction for controlling one or more of the N indoor machines, the control sub-system executes the first control instruction to control the cold medium distribution sub-system to output a first amount of the heat source or the cold source corresponding to the first control instruction to the one or more indoor machines, and to control the lubricating oil distribution sub-system to maintain an amount of oil in each of one or more of the M outdoor machines, corresponding to the one or more indoor machines, in a preset oil amount range;

wherein the lubricating oil distribution sub-system comprises a separator unit and a first valve unit, wherein:

the separator unit is configured to separate gas from liquid;

the first valve unit is configured to control heat source or cold source to be transmitted between the control system and the at least one indoor machine;

wherein the separator unit comprises a gas-liquid separator and an oil separator, and the first valve unit includes N first valves, M second valves, N third valves, M fourth valves, a fifth valve, a sixth valve, a seventh valve, an eighth valve, a ninth valve, a tenth valve, an eleventh valve, a twelfth valve and M sixteenth valves, wherein: M and N are greater than 1, one end of each of the first valves is connected with one of the indoor machines, and the other end of each of the first valves is connected with a first end of one of the third valves;

one end of each of the second valves is connected with one of the outdoor machines, and the other end of each of the second valves is connected with one end of one of the M fourth valves;

a third end of each of a first to (N−1)-th third valves among the N third valves is connected with a second end of a N-th third valve among the N third valves, and a third end of the N-th third valve among the N third valves is connected both with the gas-liquid separator and one end of the eighth valve;

the other end of the one of the M fourth valve is connected with the other end of the sixteenth valve;

the other end of the fifth valve is connected respectively with the oil separator and one end of the ninth valve;

one end of the sixth valve is connected with the oil separator, and the other end of the sixth valve is connected with one end of the twelfth valve;

one end of the seventh valve is connected with the cold medium distribution sub-system, and the other end of the seventh valve is connected with one end of the eleventh valve;

the other end of the eighth valve is connected with the other end of the twelfth valve;

the other end of the ninth valve is connected both with the other end of the eleventh valve and one end of the tenth valve; and the other end of the tenth valve is connected with the gas-liquid separator.

2. The system according to claim 1, wherein the cold medium distribution sub-system comprises a second valve unit configured to control cold medium to be transmitted between the control system and the at least one indoor machine.

3. The system according to claim 2, wherein the second valve unit comprises N thirteenth valves, N fourteenth valves and M fifteenth valves, one end of each of the N fourteenth valves is connected with one of the indoor machines, the other end of each of the N fourteenth valves is connected with one end of one of the thirteenth valves, the other ends of the thirteenth valves are all connected and are connected with one ends of the M fifteenth valves, and the other ends of the M fifteenth valves are connected respectively with ones of the outdoor machines.

4. The system according to claim 1, wherein the system further comprises:

a detection module configured to detect one or more amounts of the oil in the one or more of the M outdoor machines; and the control sub-system is further configured, upon reception of the first control instruction, to execute the first control instruction in order to start the detection module, to obtain the one or more amounts of the oil in the one or more of the M outdoor machines detected by the detection module, and upon determining that there are P outdoor machines with the amounts of the oil above an upper limit of the preset oil amount range among the M outdoor machines, to generate and transmit a second control instruction to the corresponding P outdoor machines to instruct the P outdoor machines to lower operating frequencies so that the P outdoor machines discharge the excessive oil beyond the preset oil amount range to thereby balance the amounts of the oil stored in the M outdoor machines, wherein P represents an integer no less than 0 but less than M.

5. The system according to claim 4, wherein the detection module is further configured to detect the P outdoor machines to obtain a first detection result after the P outdoor machines are instructed to lower the operating frequencies; and the control sub-system is further configured to receive the first detection result, to judge from the first detection result whether the amount of the oil in each of the P outdoor machines reaches the upper limit of the preset oil amount range, and upon determining that the amount of the oil in each of the P outdoor machines reaches the upper limit of the preset oil amount range, to generate and transmit a third control instruction to the corresponding outdoor machines to instruct the corresponding outdoor machines to raise the operating frequencies.

6. The system according to claim 1, wherein the system further comprises a detection module configured to detect one or more amounts of the oil in the one or more of the M outdoor machines; and the control sub-system is further configured, upon reception of the first control instruction, to execute the first control instruction in order to start the detection module, to obtain the one or more amounts of the oil in the one or more of the M outdoor machines detected by the detection module, and upon determining that there are P outdoor machines with the amounts of the oil below a lower limit of the preset oil amount range among the M outdoor machines, to generate and transmit a third control instruction to the corresponding P outdoor machines to instruct the P outdoor machines to raise operating frequencies so that the P outdoor machines discharge the excessive oil beyond the preset oil amount range to thereby balance the amounts of the oil stored in the M outdoor machines, wherein P represents an integer no less than 0 but less than M.

7. The system according to claim 6, wherein the detection module is further configured to detect the P outdoor machines to obtain a first detection result after the P outdoor machines are instructed to raise the operating frequencies; and the control sub-system is further configured to receive the first detection result, to judge from the first detection result whether the amount of the oil in each of the P outdoor machines reaches the lower limit of the preset oil amount range, and upon determining that the amount of the oil in one or more of the P outdoor machines reaches the lower limit of the preset oil amount range, to generate and transmit a fifth control instruction to the corresponding outdoor machines to instruct the corresponding outdoor machines to lower the operating frequencies.

8. The system according to claim 1, wherein the system further comprises a detection module configured to detect one or more contents of cold medium in the one or more of the M outdoor machines; and
the control sub-system is further configured, upon reception of the first control instruction, to execute the first control instruction in order to start the detection module, to obtain the content of cold medium in a first outdoor machine, and the content of cold medium in a second outdoor machine, of the M outdoor machines, detected by the detection module, and upon determining that the content of cold medium in the first outdoor machine is less than the content of cold medium in the second outdoor machine, to generate and execute a fourth control instruction to control the cold medium distribution sub-system to input a second amount of cold medium to the first outdoor machine and to input a third amount of cold medium to the second outdoor machine, wherein the second amount is more than the third amount.

9. The system according to claim 1, wherein the air conditioner system further comprises a detection module; and
the control sub-system comprises a reception module, a processing module and a transmission module, wherein:
the reception module is configured to receive the first control instruction;
the processing module is configured to execute the first control instruction to control the lubricating oil distribution sub-system and/or the cold medium distribution sub-system, to receive detection information transmitted by the detection module through the reception module, and to generate a corresponding control instruction according to the detection information; and
the transmission module is configured to transmit the corresponding control instruction to corresponding one or more of the M outdoor machines.

10. An air conditioner controlling method, applicable to an air conditioner system according to claim 1, the method comprising the steps of:
receiving a first control instruction; and
executing the first control instruction to control the cold medium distribution sub-system to output a first amount of heat source or cold source corresponding to the first control instruction to the one or more indoor machines, and to control the lubricating oil distribution sub-system to maintain an amount of oil in each of one or more of the M outdoor machines, corresponding to the one or more indoor machines in a preset oil amount range.

11. The method according to claim 10, wherein the step of executing the first control instruction to control the cold medium distribution sub-system to output the first amount of the heat source or the cold source corresponding to the first control instruction to the one or more indoor machines comprises:
executing the first control instruction to start a detection module in the air conditioner system, and obtaining one or more amounts of the oil in the one or more of the M outdoor machines detected by the detection module;
upon determining that there are P outdoor machines with the amounts of the oil above an upper limit of the preset oil amount range among the M outdoor machines, generating a second control instruction; and
transmitting the second control instruction to the corresponding P outdoor machines to instruct the P outdoor machines to lower operating frequencies so that the P outdoor machines discharge the excessive oil beyond the preset oil amount range to thereby balance the amounts of the oil stored in the M outdoor machines, wherein P represents an integer no less than 0 but less than M.

12. The method according to claim 11, wherein after the second control instruction is transmitted to the corresponding P outdoor machines to instruct the P outdoor machines to lower the operating frequencies, the method further comprises the steps of:
detecting the P outdoor machines to obtain a first detection result;
judging from the first detection result whether the amount of the oil in each of the P outdoor machines reaches the upper limit of the preset oil amount range; and
upon determining that the amount of the oil in one or more of the P outdoor machines reaches the upper limit of the preset oil amount range, generating and transmitting a third control instruction to the corresponding outdoor machines to instruct the corresponding outdoor machines to raise the operating frequencies.

13. The method according to claim 10, wherein the step of executing the first control instruction to control the cold medium distribution sub-system to output the first amount of the heat source or the cold source corresponding to the first control instruction to the one or more indoor machines comprises:
executing the first control instruction to start a detection module in the air conditioner system, and obtaining one or more amounts of the oil in the one or more of the M outdoor machines detected by the detection module;
upon determining that there are P outdoor machines with the amounts of the oil below a lower limit of the preset oil amount range among the M outdoor machines, generating a third control instruction; and
transmitting the third control instruction to the corresponding P outdoor machines to instruct the P outdoor machines to raise operating frequencies so that the P outdoor machines discharge the excessive oil beyond the preset oil amount range to thereby balance the amounts of the oil stored in the M outdoor machines, wherein P represents an integer no less than 0 but less than M.

14. The method according to claim 13, wherein after the third control instruction is transmitted to the corresponding P outdoor machines to instruct the P outdoor machines to raise the operating frequencies, the method further comprises:
detecting the P outdoor machines to obtain a first detection result;
judging from the first detection result whether the amount of the oil in each of the P outdoor machines reaches the lower limit of the preset oil amount range; and
upon determining that the amount of the oil in one or more of the P outdoor machines reaches the lower limit of the preset oil amount range, generating and transmitting a third control instruction to the corresponding outdoor machines to instruct the corresponding outdoor machines to lower the operating frequencies.

* * * * *